US010035937B2

(12) United States Patent
Yana Motta et al.

(10) Patent No.: US 10,035,937 B2
(45) Date of Patent: Jul. 31, 2018

(54) LOW GWP HEAT TRANSFER COMPOSITIONS

(71) Applicant: HONEYWELL INTERNATIONAL INC., Morristown, NJ (US)

(72) Inventors: Samuel F. Yana Motta, East Amherst, NY (US); Gustavo Pottker, Amherst, NY (US); Mark W. Spatz, East Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 195 days.

(21) Appl. No.: 14/703,128

(22) Filed: May 4, 2015

(65) Prior Publication Data

US 2015/0315446 A1 Nov. 5, 2015

Related U.S. Application Data

(60) Provisional application No. 61/988,363, filed on May 5, 2014.

(51) Int. Cl.
C09K 5/04 (2006.01)

(52) U.S. Cl.
CPC ........ *C09K 5/045* (2013.01); *C09K 2205/106* (2013.01); *C09K 2205/122* (2013.01); *C09K 2205/126* (2013.01); *C09K 2205/22* (2013.01); *C09K 2205/40* (2013.01)

(58) Field of Classification Search
CPC .......... C09K 2205/40; C09K 2205/126; C09K 2205/22; C09K 2205/122; C09K 2205/106; C09K 5/04
See application file for complete search history.

(56) References Cited

U.S. PATENT DOCUMENTS

| 8,333,901 | B2 * | 12/2012 | Low | ....................... G06Q 99/00 134/34 |
| 8,911,641 | B2 * | 12/2014 | Low | ..................... B60H 1/3204 134/36 |
| 2005/0247905 | A1 * | 11/2005 | Singh | ....................... C09K 3/30 252/67 |
| 2006/0243944 | A1 * | 11/2006 | Minor | .................. A62D 1/0057 252/67 |
| 2010/0012900 | A1 * | 1/2010 | Mahler | ................... C07C 17/42 252/372 |

(Continued)

OTHER PUBLICATIONS

Notification Concerning Transmittal of Intl. Preliminary Report and International Preliminary Report on Patentability for Intl. Appln. No. PCT/US2015/029131 dated Nov. 17, 2016; 9 pages.

*Primary Examiner* — Emmanuel Duke
(74) *Attorney, Agent, or Firm* — Colleen D. Szuch (57) ABSTRACT

The present invention relates, in part, to heat transfer compositions, methods, and uses thereof that include (a) from about 17% to about 40% by weight of HFC-32; (b) from about 51% to about 83% by weight of a tetrafluoropropene; and (c) from greater than about 0% to less than about 9% by weight of CO2. The amount of component (c) improves one or more of a capacity, efficiency, discharge temperature, discharge pressure, and/or energy consumption of the composition, particularly in a low or medium temperature refrigeration system and as compared to composition lacking component (c) and/or the refrigerant R-404A.

20 Claims, 4 Drawing Sheets

(56) References Cited

U.S. PATENT DOCUMENTS

| | | | | |
|---|---|---|---|---|
| 2010/0127209 A1* | 5/2010 | Singh | ............... | C09K 3/30 |
| | | | | 252/68 |
| 2011/0023507 A1* | 2/2011 | Yana Motta | ............ | C09K 3/30 |
| | | | | 62/115 |
| 2011/0037016 A1* | 2/2011 | Singh | ............... | B01D 11/0203 |
| | | | | 252/67 |
| 2011/0167841 A1* | 7/2011 | Appler | ............... | B60H 1/00585 |
| | | | | 62/77 |
| 2011/0184890 A1* | 7/2011 | Low | ............... | C08J 9/146 |
| | | | | 705/500 |
| 2011/0258147 A1 | 10/2011 | Low | | |
| 2012/0145946 A1* | 6/2012 | Minor | ............... | C09K 5/045 |
| | | | | 252/68 |
| 2012/0211421 A1* | 8/2012 | Self | ............... | B01D 53/62 |
| | | | | 210/640 |
| 2012/0241665 A1 | 9/2012 | Shibanuma et al. | | |
| 2012/0267564 A1* | 10/2012 | Leck | ............... | C09K 5/045 |
| | | | | 252/68 |
| 2013/0096218 A1* | 4/2013 | Rached | ............... | C09K 5/045 |
| | | | | 521/170 |
| 2013/0119299 A1* | 5/2013 | Low | ............... | C08J 9/127 |
| | | | | 252/68 |
| 2013/0145778 A1* | 6/2013 | Yana Motta | ............ | C09K 5/045 |
| | | | | 62/77 |
| 2014/0216074 A1* | 8/2014 | Minor | ............... | C09K 5/045 |
| | | | | 62/77 |
| 2014/0223927 A1* | 8/2014 | Pottker | ............... | C09K 5/045 |
| | | | | 62/77 |

\* cited by examiner

LOW GWP HEAT TRANSFER COMPOSITIONS

RELATED APPLICATIONS

The present invention is related to and claims the priority benefit of US. Provisional Application 61/988,363 filed May 5, 2014, which is incorporated herein by reference in its entirety.

FIELD OF THE INVENTION

This invention relates to compositions, methods and systems having utility particularly in refrigeration applications, and in certain particular aspects to heat transfer and/or refrigerant compositions useful in systems that typically utilize the refrigerant R-404A for heating and/or refrigeration (cooling) applications.

BACKGROUND

Fluorocarbon based fluids have found widespread use in many commercial and industrial applications, including as the working fluid in systems such as air conditioning, heat pump and refrigeration systems, among other uses such as aerosol propellants, as blowing agents, and as gaseous dielectrics.

Heat transfer fluids, to be commercially viable, must satisfy certain very specific and in certain cases very stringent combinations of physical, chemical and economic properties. Moreover, there are many different types of heat transfer systems and heat transfer equipment, and in many cases it is important that the heat transfer fluid used in such systems possess a particular combination of properties that match the needs of the individual system. For example, systems based on the vapor compression cycle usually involve the phase change of the refrigerant from the liquid to the vapor phase through heat absorption at a relatively low pressure and compressing the vapor to a relatively elevated pressure, condensing the vapor to the liquid phase through heat removal at this relatively elevated pressure and temperature, and then reducing the pressure to start the cycle over again.

Certain fluorocarbons, for example, have been a preferred component in many heat exchange fluids, such as refrigerants, for many years in many applications. Fluoroalkanes, such as chlorofluoromethanes and chlorofluoroethanes, have gained widespread use as refrigerants in applications including air conditioning and heat pump applications owing to their unique combination of chemical and physical properties, such as heat capacity, flammability, stability under the conditions of operation, and miscibility with the lubricant (if any) used in the system. Moreover, many of the refrigerants commonly utilized in vapor compression systems are either single components fluids, or zeotropic, azeotropic mixtures.

Concern has increased in recent years about potential damage to the earth's atmosphere and climate, and certain chlorine-based compounds have been identified as particularly problematic in this regard. The use of chlorine-containing compositions (such as chlorofluorocarbons (CFCs), hydrochlorofluorocarbons (HCFCs) and the like) as refrigerants in air-conditioning and refrigeration systems has become disfavored because of the ozone-depleting properties associated with many of such compounds. There has thus been an increasing need for new fluorocarbon and hydrofluorocarbon compounds that offer alternatives for refrigeration and heat pump applications. By way of example, in certain aspects, it has become desirable to retrofit chlorine-containing refrigeration systems by replacing chlorine-containing refrigerants with non-chlorine-containing refrigerant compounds that will not deplete the ozone layer, such as hydrofluorocarbons (HFCs).

Another concern surrounding many existing refrigerants is the tendency of many such products to cause global warming. This characteristic is commonly measured as global warming potential (GWP). The GWP of a compound is a measure of the potential contribution to the green house effect of the chemical against a known reference molecule, namely, $CO_2$ which has a GWP=1. For example, the following known refrigerants possess the following Global Warming Potentials:

| REFRIGERANT | GWP (IPCC AR5) |
|---|---|
| R410A | 2088 |
| R-507 | 3985 |
| R404A | 3943 |
| R407C | 1774 |

While each of the above-noted refrigerants has proven effective in many respects, these materials are become increasingly less preferred since it is frequently undesirable to use materials having relatively high GWP. A need exists, therefore, for substitutes for these and other existing refrigerants having undesirable GWPs.

There has thus been an increasing need for new fluorocarbon and hydrofluorocarbon compounds and compositions that are attractive alternatives to the compositions heretofore used in these and other applications. For example, it has become desirable to retrofit certain systems, including chlorine-containing and certain HFC-containing refrigeration systems by replacing the existing refrigerants with refrigerant compositions that will not deplete the ozone layer, will not cause unwanted levels of global warming, and at the same time will satisfy all of the other stringent requirements of such systems for the materials used as the heat transfer material.

With respect to performance properties, the present applicants have come to appreciate that that any potential substitute refrigerant must also possess those properties present in many of the most widely used fluids, such as excellent heat transfer properties, chemical stability, low- or no-toxicity, low or non-flammability and lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for refrigerant substitutes to be effective without major engineering changes to conventional vapor compression technology currently used with existing refrigerants, such as CFC-containing refrigerants.

Flammability is another important property for many applications. That is, it is considered either important or essential in many applications, including particularly in heat transfer applications, to use compositions which are non-flammable or of relatively low flammability. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are highly flammable. For example, the fluoroalkane difluoroethane (HFC-152a) is flammable and therefore not viable for use alone in many applications.

Applicants have thus come to appreciate a need for compositions, and particularly heat transfer compositions, that are potentially useful in numerous applications, including vapor compression heating and cooling systems and methods, while avoiding one or more of the disadvantages noted above.

SUMMARY

In certain aspects, the present invention relates to compositions, methods, uses and systems which comprise or utilize a multi-component mixture comprising: (a) from about 17% to about 40% by weight of HFC-32; (b) from about 51% to about 83% by weight of a tetrafluoropropene; and (c) from about or greater than about 0% to about or less than about 9% by weight of $CO_2$, provided that the amount of component (c) is effective to improve one or more of capacity, energy consumption, efficiency, discharge temperature, and/or discharge pressure of the composition, as compared to compositions lacking this component, particularly compositions including only components (a) and (b).

In alternative aspects, the composition includes (a) from about 17% to about 25% by weight of HFC-32; (b) from about 69% to about 83% by weight of a tetrafluoropropene; and (c) from about or greater than about 0% to about or less than about 6% by weight of $CO_2$, provided that the amount of component (c) is effective to improve one or more of capacity, energy consumption, discharge temperature, and/or discharge pressure of the composition, as compared to compositions lacking this component, particularly compositions including only components (a) and (b).

In further alternative aspects, the composition includes (a) from about 17% to about 22% by weight of HFC-32; (b) from about 73% to about 73% by weight of a tetrafluoropropene; and (c) from about or greater than about 0% to about or less than about 5% by weight of $CO_2$, provided that the amount of component (c) is effective to improve one or more of capacity, energy consumption, discharge temperature, and/or discharge pressure of the composition, as compared to compositions lacking this component, particularly compositions including only components (a) and (b).

In even further alternative aspects, the composition includes (a) from about 17% to about 22% by weight of HFC-32; (b) from about or greater than about 73% to about or less than about 82% by weight of a tetrafluoropropene; and (c) from about or greater than about 1% to about or less than about 5% by weight of $CO_2$, provided that the amount of component (c) is effective to improve one or more of capacity, energy consumption, discharge temperature, and/or discharge pressure of the composition, as compared to compositions lacking this component, particularly compositions including only components (a) and (b).

In even further alternative aspects, the composition includes (a) from about 18% to about 22% by weight of HFC-32; (b) from about 74% to about or less than about 80% by weight of a tetrafluoropropene; and (c) from about or greater than about 2% to about or less than about 4% by weight of $CO_2$, provided that the amount of component (c) is effective to improve heating capacity, efficiency, discharge temperature, and/or discharge pressure of the composition, as compared to compositions lacking this component, particularly compositions including only components (a) and (b).

In certain non-limiting aspects the tetrafluoropropene comprises, consists essentially of, or consists of 2,3,3,3-tetrafluoropropropene.

The present invention also provides methods and systems that utilize the compositions of the present invention, including methods and systems for transferring heat, and methods and systems for replacing an existing heat transfer fluid in an existing heat transfer system, and methods of selecting a heat transfer fluid in accordance with the present invention to replace one or more existing heat transfer fluids. While in certain embodiments the compositions, methods, and systems of the present invention can be used to replace any known heat transfer fluid, in further, and in some cases preferred embodiments, the compositions of the present application may be used as a replacement for R-404A.

Refrigeration systems contemplated in accordance with the present invention include, but are not limited to, automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, transport refrigeration systems, heat pump systems, and combinations of two or more of these. In certain non-limiting aspects, the compositions of the present invention may be used as an R-404A replacement in low and medium temperature refrigeration systems. In certain aspects, such systems may be used for storage of frozen or refrigerated goods, such as self-contained or "plug-in" type refrigerators or freezers or "reach-in" type of refrigerators or freezers. Non-limiting examples of such systems include those typically used for indoors or outdoors in places such as restaurants, convenience stores, gas stations, grocery stores, and the like.

Additional embodiments, use, and advantages will be readily apparent to the skilled artisan on the basis of the disclosure provided herein.

DETAILED DESCRIPTION OF PREFERRED EMBODIMENTS

R-404A is commonly used in refrigeration systems, particularly low and medium temperature refrigeration systems such as those defined below. It has an estimated Global Warming Potential (GWP) of 3943, which is much higher than is desired or required. Applicants have found that the compositions of the present invention satisfy in an exceptional and unexpected way the need for new compositions for such applications, particularly though not exclusively refrigeration systems, having improved performance with respect to environmental impact while at the same time providing other important performance characteristics, such as capacity, efficiency, discharge temperature, discharge pressure, energy consumption, flammability and/or toxicity. In preferred embodiments the present compositions provide alternatives and/or replacements for refrigerants currently used in such applications, particularly and preferably R-404A, that at once have lower GWP values and have a close match in heating and cooling capacity to R-404A in such systems.

Heat Transfer Compositions

The compositions of the present invention are generally adaptable for use in heat transfer applications, that is, as a heating and/or cooling medium, but are particularly well adapted for use, as mentioned above, in refrigeration systems (particularly, though not exclusively, low and medium temperature refrigeration systems) that have heretofore used R-404A.

Applicants have found that use of the components of the present invention within the stated ranges is important to achieve the important but difficult to achieve combinations of properties exhibited by the present compositions, particularly in the preferred systems and methods, and that use of these same components but substantially outside of the identified ranges can have a deleterious effect on one or more of the important properties of the compositions of the invention. In particular, and as demonstrated herein, applicants have surprisingly and unexpectedly discovered ranges for the present components where the composition exhibit improved capacity, efficiency, discharge pressure, discharge temperature, and/or energy consumption, as compared to R-404A in such systems and under the same conditions.

In certain embodiments, the HFC-32 is present in the compositions of the invention in an amount of from about 17 wt. % to about 40 wt. % by weight of the composition, in certain preferred aspects from about 17 wt. % to about 25 wt. % by weight of the composition, in certain preferred aspects from about 17 wt. % to about 22 wt. % by weight of the composition, and in certain preferred aspects from about 18 wt. % to about 22 wt. % by weight of the composition.

In further embodiments, the tetrafluoropropene is provided in an amount from about 51 wt. % to about 83 wt. % by weight of the composition, in certain preferred aspects from about 69 wt. % to about 83 wt. % by weight, in certain preferred aspects from about 73 wt. % to about 83 wt. % by weight of the composition, in certain preferred aspects from about 73 wt. % to about 82 wt. % by weight of the composition, in certain preferred aspects from about or less than about 70 wt. % to about or less than about 80 wt. % by weight of the composition, and in certain preferred aspects from about 74 wt. % to about or less than about 80 wt. % by weight of the composition. In certain embodiments, the second component comprises, consists essentially of, or consists of, 2,3,3,3-tetrafluoropropene (HFO-1234yf).

In even further embodiments, the compositions of the invention include CO2 in an amount from about or greater than about 0 wt. % to about or less than about 9 wt. % by weight of the composition, in certain preferred embodiments from about or greater than about 0 wt. % to about or less than about 6 wt. % by weight of the composition, in certain preferred embodiments from about or greater than about 0 wt. % to about or less than about 5 wt. % by weight of the composition, in certain preferred embodiments from about or greater than about 1 wt. % to about or less than about 5 wt. % by weight of the composition, and in certain preferred embodiments from about or greater than about 2 wt. % to about or less than about 4 wt. % by weight of the composition.

In certain aspects of the invention, Applicants have found that the inclusion of CO2 in the compositions of the present invention results in surprisingly and unexpected improvement in the use of such compositions with low and medium temperature refrigeration systems, as compared to R-404A and/or compositions that lack CO2. More specifically, Applicants demonstrate in the Examples below that a myriad of properties are improved with amounts of CO2 at less than 9%, preferably at less than 6% and even more preferably at about 2 to 4%, based on the total weight of the composition. In particular, within such ranges the data herein demonstrate surprisingly and unexpected empirical improvement in one or more of the following properties, as compared to expected values using thermodynamic calculations: capacity, efficiency, discharge pressure, discharge temperature, energy consumption and combinations thereof. In certain aspects, and as elaborated upon below, the observed values of the compositions are within 15% of the values demonstrated for R-404A, in certain preferred embodiments within 10% of R-404A, and in certain preferred embodiments within 5% of R-404A.

Applicants have also found that the compositions of the present invention are capable of achieving low GWP. By way of non-limiting example, the following Table 1 illustrates the substantial GWP superiority of certain compositions of the present invention, which are described in parenthesis in terms of weight fraction of each component, in comparison to the GWP of R-404A, which has a GWP of 3943.

TABLE 1

| Amount of CO2 (%) | Composition | Name | GWP (AR5 values) | GWP (% of R404A) |
|---|---|---|---|---|
| — | R125/R143a/R134a (0.44/0.52/0.04) | R404A (Baseline) | 3943 | 100% |
| 0% | R32/R1234yf (0.215/0.785) | A0 | 146 | 4% |
| 3% | R32/R1234yf/CO2 (0.215/0.755/0.03) | A1 | 146 | 4% |
| 6% | R32/R1234yf/CO2 (0.215/0.725/0.06) | A2 | 146 | 4% |
| 9% | R32/R1234yf/CO2 (0.215/0.695/0.09) | A3 | 146 | 4% |

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent.

Commonly used refrigeration lubricants such as Polyol Esters (POEs) and Poly Alkylene Glycols (PAGs), PAG oils, silicone oil, mineral oil, alkyl benzenes (ABs) and poly (alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils have sufficient solubility with the refrigerant that is comprised of an iodocarbon, wherein the combination of the iodocarbon and the hydrocarbon oil are more stable than other types of lubricant. Such combinations are therefore be advantageous. Preferred lubricants include polyol esters (POEs). Polyol esters are highly preferred in certain embodiments because they are currently in use in particular applications such as mobile air-conditioning. Of course, different mixtures of different types of lubricants may be used.

Heat Transfer Methods and Systems

The present methods, systems and compositions are adaptable for use in connection with a wide variety of heat transfer systems in general and refrigeration systems in particular, such as air-conditioning, refrigeration, heat-pump systems, and the like. Generally speaking, such refrigeration systems contemplated in accordance with the present invention include, but are not limited to, automotive air conditioning systems, residential air conditioning systems, commercial air conditioning systems, residential refrigerator systems, residential freezer systems, commercial refrigeration systems, small refrigeration systems, commercial freezer systems, transport refrigeration, chiller air conditioning systems, chiller refrigeration systems, heat pump systems, and combinations of two or more of these.

In certain preferred embodiments, the compositions of the present invention are used in refrigeration systems originally designed for use with an HFC refrigerant, such as, for example, R-404A. Such refrigeration systems may include, but are not limited to, low and medium temperature refrigeration systems, particularly vapor compression refrigeration systems. In certain aspects, such systems may be used for storage of frozen or refrigerated goods, such as self-contained, "plug-in" or hermetic type refrigerators or freezers or "reach-in" type of refrigerators or freezers. Non-limiting examples of such systems include those typically used for indoors or outdoors in places such as restaurants, convenience stores, gas stations, grocery stores, and the like.

In certain preferred embodiments, the compositions of the present invention exhibit one or more of capacity, efficiency, energy consumption, discharge temperature, and/or discharge pressure that is comparable with or better than that of R-404A, particularly within a low and/or medium temperature refrigeration system. In certain aspects, the compositions of the present invention exhibit a capacity of from greater than or equal to about 90% to less than or equal to about 110% of the capacity of R-404A in the same low and/or medium temperature refrigeration system and under the same conditions. In certain preferred aspects, the compositions of the present invention exhibit a capacity of from greater than or equal to about 95% to less than or equal to about 105% of the capacity of R-404A in the same low and/or medium temperature refrigeration system and under the same conditions.

In further aspects, the compositions of the present invention exhibit an efficiency (or COP) of at least 90% of the COP of R-404A in the same low and/or medium temperature refrigeration system and under the same conditions. In certain aspects, the compositions of the present invention exhibit a COP of at least 95% of the COP of R-404A in the same low and/or medium temperature refrigeration system and under the same conditions. In certain aspects, the compositions of the present invention exhibit a COP of at least 100% of the COP of R-404A in the same low and/or medium temperature refrigeration system and under the same conditions.

In further aspects, the compositions of the present invention exhibit a high-side discharge pressure of from greater than or equal to about 85% to less than or equal to about 115% of the discharge pressure of R-404A in the same low and/or medium temperature refrigeration system and under the same conditions. In certain aspects, the compositions of the present invention exhibit a high-side discharge pressure of from greater than or equal to about 90% to less than or equal to about 110% of the discharge pressure of R-404A in the same low and/or medium temperature refrigeration system and under the same conditions. In certain aspects, the compositions of the present invention exhibit a high-side discharge pressure of from greater than or equal to about 95% to less than or equal to about 105% of the discharge pressure of R-404A in the same low and/or medium temperature refrigeration system and under the same conditions.

In even further aspects, the compositions of the present invention exhibit a high-side discharge temperature of no more than 15° C. greater than the discharge temperature of R-404A in the same low and/or medium temperature refrigeration system and under the same conditions. In certain aspects, the compositions of the present invention exhibit high-side discharge temperature of no more than 10° C. greater than the discharge temperature of R-404A in the same low and/or medium temperature refrigeration system and under the same conditions. In certain aspects, the compositions of the present invention exhibit high-side discharge temperature of no more than 5° C. greater than the discharge temperature of R-404A in the same low and/or medium temperature refrigeration system and under the same conditions.

The preferred compositions of the present invention tend to exhibit many of the desirable characteristics of R-404A but have a GWP that is substantially lower than that of R-404A while at the same time having a capacity, efficiency, energy consumption, discharge temperature and/or discharge pressure that is substantially similar to or substantially matches, and preferably is as high as or higher than R-404A. In particular, applicants have recognized that certain preferred embodiments of the present compositions tend to exhibit relatively low global warming potentials ("GWPs"), preferably less than about 1000, preferably not greater than 500, more preferably not greater than about 250, and even more preferably not greater than about 150.

In certain embodiments, a low temperature refrigeration system is used herein to refer to a refrigeration system that utilizes one or more compressors and operates under or within the following conditions:

a. Condenser temperature from about 20° C. to about 50° C., in certain preferred aspects from about 25° C. to about 45° C.;
b. Evaporator temperature from about −45° C. to about or less than about −10° C., in certain preferred aspects from about −40° C. to about −25° C., with an evaporator temperature preferably of about −32° C.;
c. Degree of superheat at evaporator outlet of from about 0° C. to about 10° C., with a degree of superheat at evaporator outlet of from about 1° C. to about 6° C.;
d. System with a degree of superheat in the suction line of from about 15° C. to about 40° C., with a degree of superheat in the suction line of from about 20° C. to about 30° C. The superheat along the suction line may also (or alternatively be generated by a heat exchanger between the liquid-line (refrigerant line between condenser and expansion device) and the suction-line (refrigerant line between compressor and evaporator), typically known as suction-line/liquid-line heat exchanger, in order to improve system performance. The suction-line/liquid line heat exchanger provides substantial degree of subcooling at the inlet of the expansion device and degree of superheat at the compressor inlet.

In certain embodiments, a medium temperature refrigeration system is used herein to refer to a refrigeration system that utilizes one or more compressors and operates under or within the following conditions:

a. Condenser temperature of from about 20° C. to about 60° C., in certain preferred aspects from 25° C. to 45° C.;

b. Evaporator temperature of from about −25° C. to about or less than about 0° C., n certain preferred aspects from about −20° C. to about −5° C., with an evaporator temperature of about −10° C.;

c. Degree of superheat at evaporator outlet of from about 0° C. to about 10° C., with a degree of superheat at evaporator outlet of from about 1° C. to about 6° C.; and d. System with a degree of superheat in the suction line of from about 5° C. to about 40° C., with a degree of superheat in the suction line preferably of from about 15° C. to about 30° C. The superheat along the suction line may also be generated by a heat exchanger as described in item 3).

Examples of such refrigeration systems are provided in Examples 1-3, below. To this end, such systems may include low temperature refrigeration applications (Examples 1 and 2), including commercial freezers or systems that may be used for the storage and maintenance of frozen goods. They may also include medium-temperature commercial applications (Example 3), such as commercial refrigerators, including systems for the storage of fresh goods. The examples below provide typical conditions and parameters that are used for such applications. These conditions, however, are not considered limiting to the invention, as one of skill in the art will appreciate that they may be varied based on one or more of a myriad of factors, including but not limited to, ambient conditions, intended application, time of year, and the like.

In certain other preferred embodiments, the refrigeration compositions of the present invention may be used in refrigeration systems containing a lubricant used conventionally with R-404A, such as polyolester oils, and the like, or may be used with other lubricants traditionally used with HFC refrigerants, as discussed in greater detail above. As used herein the term "refrigeration system" refers generally to any system or apparatus, or any part or portion of such a system or apparatus, which employs a refrigerant to provide heating or cooling. Such air refrigeration systems include, for example, air conditioners, electric refrigerators, chillers, or any of the systems identified herein or otherwise known in the art.

EXAMPLES

The following examples are provided for the purpose of illustrating the present invention but without limiting the scope thereof.

Example 1: Low-Temp Refrigeration Application—Performance

Due to certain characteristics of refrigeration systems, including particularly low temperature refrigeration systems containing or designed to contain R404A refrigerant, it is important in certain embodiments that such systems are capable of exhibiting adequate performance parameters system with respect to R404A. Such operating parameters include:

Capacity of at least 90%, and even more preferably greater than 95% of the capacity of the system operating with R404A. This parameter allows the use of existing compressors and components designed for R404A.

Equal or better efficiency than R404A leading to energy savings with new mixture.

Equal or lower energy consumption

This example illustrates the COP and capacity performance of compositions labeled A0-A3 of the present invention when used as a replacement for R404A in a low-temperature refrigeration system. The coefficient of performance (COP) is a universally accepted measure of refrigerant performance, especially useful in representing the relative thermodynamic efficiency of a refrigerant in a specific cooling cycle involving evaporation or condensation of the refrigerant. In refrigeration engineering, this term expresses the ratio of useful refrigeration to the energy applied by the compressor in compressing the vapor and by fans (when applicable). The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A commercially available low temperature refrigeration "reach-in freezer" used for refrigeration of frozen food was evaluated with the baseline refrigerant R404A and mixtures A0, A1, A2 to A3. In the case of such a system illustrated in this Example, the condenser temperature operated around 34° C., which generally corresponded to an indoor room temperature of about 25° C. The evaporating temperature was about −35° C., which corresponded to a product temperature of about −18° C. The degree of superheat at evaporator outlet was about 5° C. Such low temperature refrigeration systems are usually equipped with a suction-line/liquid-line heat exchanger. The amount of degree of subcooling and superheat provided by the suction-line/liquid-line heat exchanger typically depends upon the refrigerant thermodynamic properties and the heat transfer goodness of the heat exchanger. A measure of the heat transfer goodness of a suction-line/liquid-line heat exchanger is given by its effectiveness which varies from 0% (minimum heat transfer) to 100% (maximum heat transfer). For this particular example, the effectiveness of the suction-line/liquid-line heat exchanger was about 50%. An additional refrigerant temperature gain along the refrigerant line between the suction-line/liquid-line heat exchanger and the compressor inlet is typically 2° C.

The performance evaluations were done using standardized tests as described in ASHRAE standard 72-2005

"Method of Testing Commercial Refrigerators and Freezers" which established requirements and operating conditions for testing those systems. During these tests, cycle pressures and temperatures are measured, as well as power consumption for compressor and fans. These test have a duration of at least 24-h, during which the system cycles ON and OFF. The system also experiences defrost cycles.

From these tests, two sets of results were obtained:
1) Taking a data for single cycle, average capacity and COP were obtained by integrating for the duration of the cycle.
2) Another mean of evaluating performance is by measuring the overall energy consumption over a 24 h period, which may include effects of ON/OFF operation as well as defrost cycles.

Figure 1:
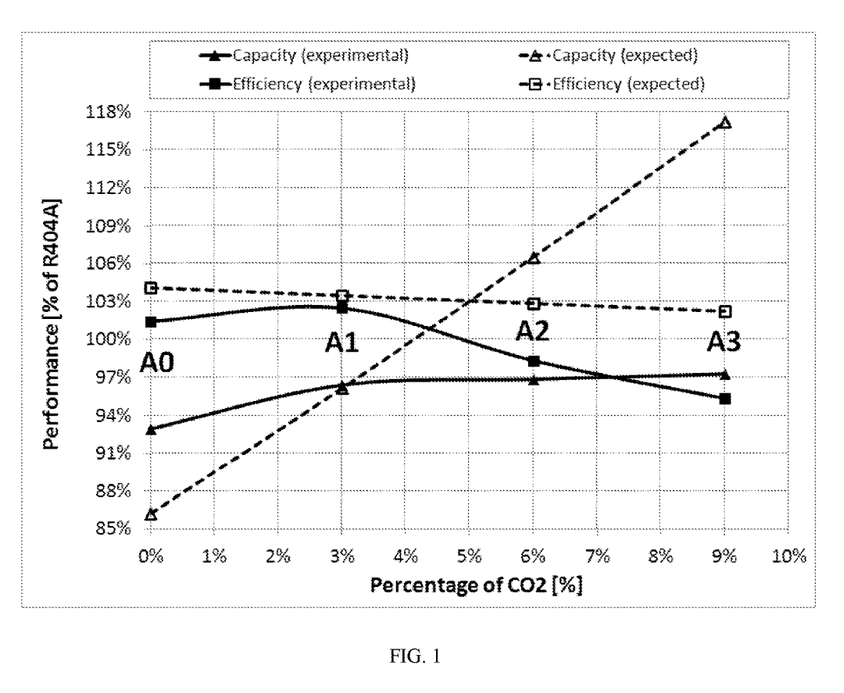
FIG. 1 provides a graphic illustration of expected versus measured (experimental) capacity and efficiency (COP) in systems having increasing amounts of $CO_2$ between 0% and 9%.
Figure 2:
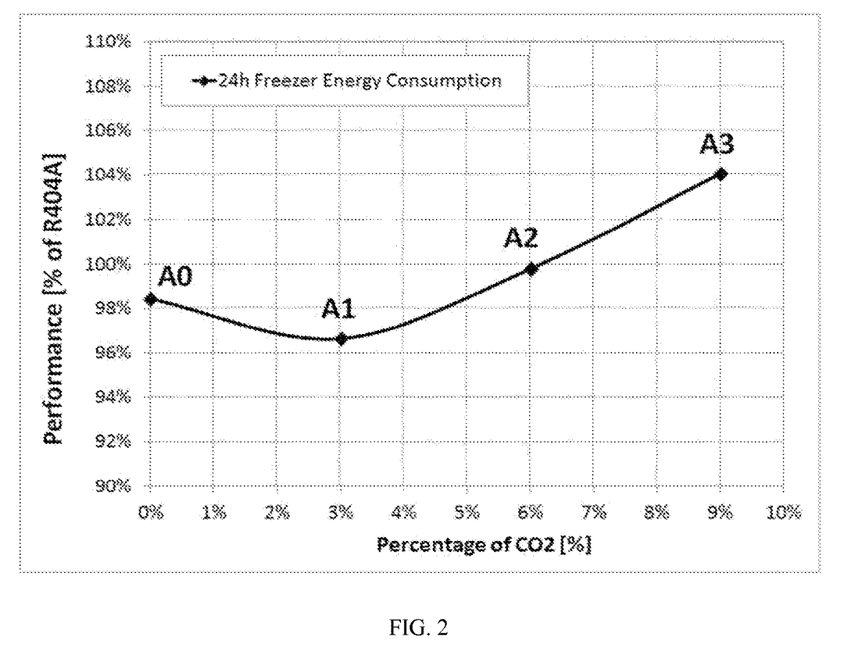
FIG. 2 provides a graphic illustration of the results of experimental energy consumption versus the amount of $CO_2$ in the mixture.

The Table 2 below shows side-by-side both the expected values, calculated through thermodynamic properties applied to refrigeration cycle, and the "experimental" values, obtained experimentally through the standardized tests, for both Capacity and COP. FIG. 1 illustrates the results of Table 2 in the form of a chart, as a function of the % amount of CO2 in the mixture. Table 3 and FIG. 2 show the performance results in terms of 24 h system energy consumption. All results are referenced to R-404A being at 100% for capacity and COP.

TABLE 2

Capacity and COP results

| Amount of CO2 (%) | Name | Capacity [% of R404A] | | COP [% of R404A] | |
| --- | --- | --- | --- | --- | --- |
| | | Expected | Experimental | Expected | Experimental |
| — | R404A | 100% | 100% | 100% | 100% |
| 0% | A0 R32/R1234yf (0.215/0.785) | 86% | 93% | 104% | 101% |
| 3% | A1 R32/R1234yf/CO2 (0.215/0.755/0.03) | 96% | 96% | 103% | 102% |
| 6% | A2 R32/R1234yf/CO2 (0.215/0.725/0.06) | 105% | 97% | 102% | 98% |
| 9% | A3 R32/R1234yf/CO2 (0.215/0.695/0.09) | 115% | 97% | 101% | 95% |

TABLE 3

Experimental energy consumption results

| Amount of CO2 (%) | Name | Experimental 24 h Energy Consumption [% of R404A] |
| --- | --- | --- |
| — | R404A (baseline) | 100% |
| 0% | A0 R32/R1234yf (0.215/0.785) | 98% |
| 3% | A1 R32/R1234yf/CO2 (0.215/0.755/0.03) | 97% |
| 6% | A2 R32/R1234yf/CO2 (0.215/0.725/0.06) | 100% |
| 9% | A3 R32/R1234yf/CO2 (0.215/0.695/0.09) | 104% |

As illustrated in Table 2 and FIG. 1, the expected capacity should increase linearly with the amount of CO2. However, applicants found unexpectedly that the actual capacity (experimental) increases with the first 3% of CO2 then remains nearly unchanged with higher amounts of CO2. As also illustrated in Table 2 and FIG. 2, the expected COP should slightly decrease with the increase in the amount of CO2. However, applicants found unexpectedly that the actual COP (experimental) increases upon the addition of CO2 and peaks at around 3% of CO2. It then drops sharply with CO2 amounts above 3%.

Figure 3:
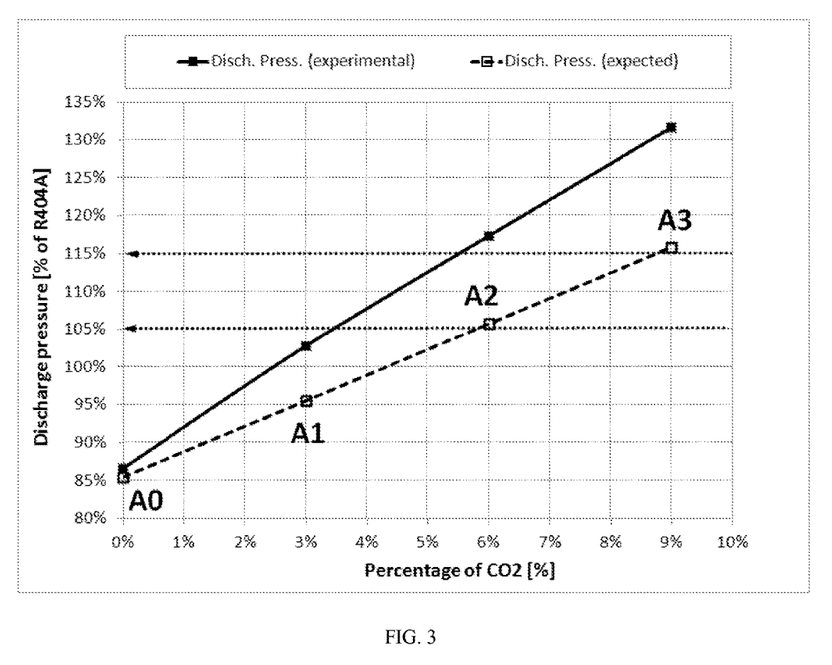
FIG. 3 provides a graphic illustration of the expected versus measured (experimental) compressor discharge pressure versus the amount of $CO_2$ in the mixture.

As illustrated in FIG. 3 and Table 2, the 24 h energy consumption unexpectedly reaches a minimum with a mixture of around 3% of CO2.

Example 2: Low-Temperature Refrigeration Application—Reliability Parameters

Due to certain characteristics of refrigeration systems, including particularly low temperature refrigeration systems containing or designed to contain R404A refrigerant, it is important in certain embodiments that such systems are capable of exhibiting reliable system operating parameters with respect to R404A. Such operating parameters include:

High-Side Pressure that is within about 115%, and even more preferably within about 105% of the high side pressure of the system using R404A. This parameter allows the use of existing compressors and components designed for R404A.

Compressor discharge temperature that does not exceed R404A discharge temperature by more than 15° C., and no more than 10° C. The advantage of such a characteristic is that it permits the use of existing equipment without activation of the thermal protection aspects of the system, which is designed to protect compressor components.

Discharge pressure and temperature were estimated for R404A (baseline) and mixtures A0-A3 by the same methods and under the same operating conditions described in Example 1. Those parameters were also measured experimentally using the same reach-in freezer, procedures and standard described in Example 1.

Figure 4:
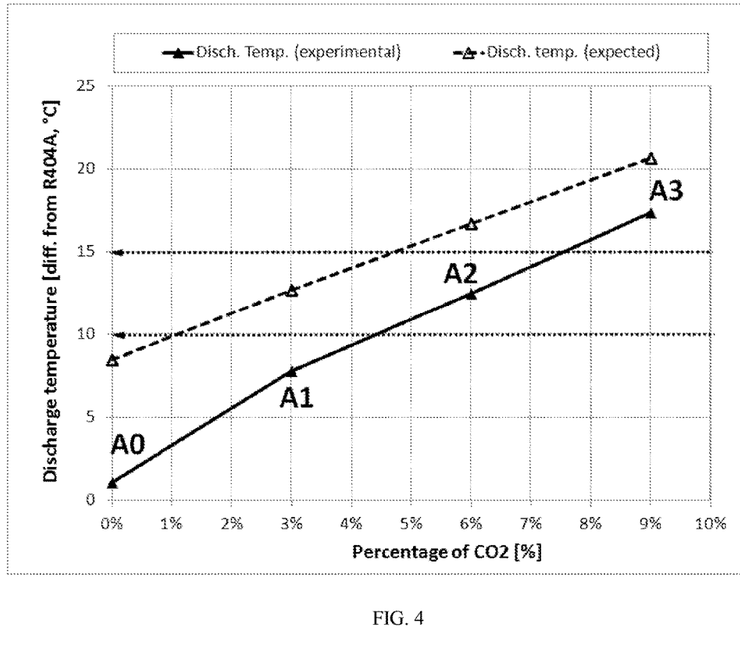
FIG. 4 provides a graphic illustration of the compressor discharge temperature versus the amount of $CO_2$ in the mixture.

The Table 4 below shows side-by-side both the expected values, calculated through thermodynamic properties applied to refrigeration cycle, and the experimental values, obtained experimentally, for discharge pressure and compressor discharge temperature. FIGS. 3 and 4 illustrates the results of Table 4 in the form of a chart, as a function of the % amount of CO2 in the mixture.

TABLE 4

Results of discharge pressure and compressor discharge temperature

| Amount of CO2 (%) | Name | Discharge Pressure [% of R404A] | | Discharge Temp. [Difference from R404A, in ° C.] | |
| --- | --- | --- | --- | --- | --- |
| | | Expected | Experimental | Expected | Experimental |
| — | R404A (baseline) | 100% | 100% | 0 | 0 |
| 0% | A0 R32/R1234yf (0.215/0.785) | 85% | 87% | +8 | +1 |
| 3% | A1 R32/R1234yf/CO2 (0.215/0.755/0.03) | 96% | 103% | +13 | +8 |

TABLE 4-continued

Results of discharge pressure and compressor discharge temperature

| Amount of CO2 (%) | Name | Discharge Pressure [% of R404A] | | Discharge Temp. [Difference from R404A, in ° C.] | |
|---|---|---|---|---|---|
| | | Expected | Experimental | Expected | Experimental |
| 6% | A2 R32/R1234yf/CO2 (0.215/0.725/0.06) | 106% | 117% | +17 | +12 |
| 9% | A3 R32/R1234yf/CO2 (0.215/0.695/0.09) | 116% | 132% | +21 | +17 |

As illustrated in Table 4 and FIG. 3, both the expected and the actual (experimental) discharge pressures increased linearly with the amount of CO2. Applicants found unexpectedly, however, that the actual discharge pressure was significantly more sensitive to the amount of CO2 than estimated. The actual discharge pressure reached 105% with CO2 amounts around 3-4% and 115% between 5-6% of CO2.

As illustrated in Table 4 and FIG. 4, both the expected and the actual (experimental) discharge temperature increased steadily with the amount of CO2. Applicants found unexpectedly, however, that the actual discharge temperature was between 7-4° C. lower than the estimated values. The actual discharge temperatures are within 10° C. of R404A with CO2 amounts below around 4% and within 15° C. below around 7% of CO2.

Example 3: Medium Temp Refrigeration Application

This example illustrates the COP, capacity, discharge pressure and temperature of embodiments A0-A3 of the present invention when used as a replacement for R-404A in a medium temperature refrigeration system.

A typical medium temperature refrigeration application was evaluated with the baseline refrigerant R-404A and mixtures A0, A1, A2 to A3 using the same methods described to estimate the performance in low-temperature application, as described in Example 1. In the case of such a medium temperature refrigeration system illustrated in this Example, the condenser temperature operated around 35° C., which generally corresponded to an indoor room temperature of about 25° C. The evaporating temperature was −10° C., which corresponded to a product temperature of about 0° C. The degree of superheat at evaporator outlet was about 5° C. Such medium temperature refrigeration systems are usually equipped a suction-line/liquid-line heat exchanger as described in Example 1. For this particular example, the effectiveness of the suction-line/liquid-line heat exchanger is about 50%. An additional refrigerant temperature gain along the refrigerant line between the suction-line/liquid-line heat exchanger and the compressor inlet is typically 2° C. The compressor efficiency was about 70%.

The Table 5 below shows capacity, COP, discharge pressure and temperature with for the 4 mixtures with respect to R404A values, estimated through thermodynamic properties applied to refrigeration cycle.

TABLE 5

Capacity, COP, discharge pressure and temperature at medium temperature

| Amount of CO2 (%) | Name | Capacity [% of R404A] | COP [% of R404A] | Discharge Pressure [% of R404A] | Discharge Temp. [Diff. in ° C., from R404A] |
|---|---|---|---|---|---|
| — | R404A (baseline) | 100% | 100% | 100% | 0 |
| 0% | A0 R32/R1234yf (0.215/0.755) | 88% | 103% | 84% | +5 |
| 3% | A1 R32/R1234yf/CO2 (0.215/0.755/0.03) | 98% | 102% | 95% | +7 |
| 6% | A2 R32/R1234yf/CO2 (0.215/0.725/0.06) | 108% | 102% | 106% | +10 |
| 9% | A3 R32/R1234yf/CO2 (0.215/0.695/0.09) | 118% | 101% | 117% | +12 |

As illustrated in Table 5, the expected capacity and COP should increase linearly with the amount of CO2. A closer match in capacity with slightly better COP would happen around 3% of CO2. Both discharge pressure and temperature are also demonstrated to increase steadily with the amount of CO2. Discharge pressure is around a match of R-404A with CO2 amounts of about 3-6%. Discharge temperatures are within 10° C. of R404A with CO2 amounts below 6%.

What is claimed is:

1. A heat transfer composition comprising a refrigerant consisting essentially of:
    (a) about 21.5% weight of HFC-32;
    (b) about 75.5% by weight of 2,3,3,3-tetrafluoropropene; and
    (c) from 2% to 4% by weight of CO2,
provided that the amount of component (c) is effective to improve one or more of a capacity, efficiency, discharge temperature, discharge pressure, or energy consumption of the composition in a low or medium temperature refrigeration system, as compared to composition lacking component (c).

2. The heat transfer composition of claim 1, wherein said refrigerant comprises about 3% by weight of CO2.

3. The heat transfer composition of claim 2, wherein the composition exhibits a capacity of from greater than or equal to 97% to less than or equal to about 100% of the capacity of R-404A in the same low and/or medium temperature refrigeration system and under the same conditions.

4. The heat transfer composition of claim 2, wherein the composition exhibits an efficiency that is not less than the efficiency of a composition consisting essentially of about 21.5% weight of HFC-32, about 75.5% by weight of 2,3,3,3-tetrafluoropropene and no CO2 in the same low and/or medium temperature refrigeration system and under the same conditions.

5. The heat transfer composition of claim 2, wherein the composition exhibits an efficiency of at least 100% of the efficiency of R-404A in the same low and/or medium temperature refrigeration system and under the same conditions.

6. The heat transfer composition of claim 2, wherein the composition exhibits a high-side discharge pressure of from greater than or equal to about 85% to less than or equal to about 115% of the discharge pressure of R-404A in the same low and/or medium temperature refrigeration system and under the same conditions.

7. The heat transfer composition of claim 2, wherein the composition exhibits a high-side discharge pressure of from greater than or equal to about 90% to less than or equal to about 110% of the discharge pressure of R-404A in the same low and/or medium temperature refrigeration system and under the same conditions.

8. The heat transfer composition of claim 2, wherein the composition exhibits a high-side discharge pressure of from greater than or equal to about 95% to less than or equal to about 105% of the discharge pressure of R-404A in the same low and/or medium temperature refrigeration system and under the same conditions.

9. The heat transfer composition of claim 2, wherein the composition exhibits a high-side discharge temperature of no more than 15° C. greater than the discharge temperature of R-404A in the same low and/or medium temperature refrigeration system and under the same conditions.

10. The heat transfer composition of claim 2, wherein the composition exhibits a high-side discharge temperature of no more than 10° C. greater than the discharge temperature of R-404A in the same low and/or medium temperature refrigeration system and under the same conditions.

11. The heat transfer composition of claim 2, wherein the composition exhibits a high-side discharge temperature of no more than 5° C. greater than the discharge temperature of R-404A in the same low and/or medium temperature refrigeration system and under the same conditions.

12. The heat transfer composition of claim 2, further comprising a lubricant.

13. The heat transfer composition of claim 12, wherein the lubricant comprises a polyolester oil.

14. A method of replacing an existing heat transfer fluid contained in low or medium temperature refrigeration system comprising removing at least a portion of said existing heat transfer fluid from said system, said existing heat transfer fluid comprising HFC-404A, and replacing at least a portion of said existing heat transfer fluid by introducing into said system a heat transfer composition of claim 2.

15. A heat transfer system comprising a compressor, a condenser and an evaporator in fluid communication, and a heat transfer composition in said system, said heat transfer composition comprising the composition of claim 2.

16. The heat transfer system of claim 15 wherein said heat transfer system is a low or medium temperature refrigeration system.

17. A heat transfer composition comprising a refrigerant consisting essentially of:
(a) about 21.5% weight of HFC-32;
(b) about 75.5% by weight of 2,3,3,3-tetrafluoropropene; and
(c) from 2% to 4% by weight of $CO_2$.

18. The heat transfer composition of claim 17, wherein said refrigerant comprises about 3% by weight of $CO_2$.

19. The heat transfer composition of claim 18, wherein the composition exhibits a capacity of from greater than or equal to 97% to less than or equal to about 100% of the capacity of R-404A under temperature refrigeration conditions.

20. The heat transfer composition of claim 18, wherein the composition exhibits a capacity of from greater than or equal to 97% to less than or equal to about 100% of the capacity of R-404A under medium temperature refrigeration conditions.

* * * * *